(12) United States Patent
Hiramaru et al.

(10) Patent No.: US 10,279,860 B2
(45) Date of Patent: May 7, 2019

(54) SWING ARM OF SADDLE RIDING VEHICLE

(71) Applicant: HONDA MOTOR CO., LTD., Tokyo (JP)

(72) Inventors: Masayuki Hiramaru, Kumamoto (JP); Keita Mikura, Kikuchi-gun (JP)

(73) Assignee: HONDA MOTOR CO., LTD., Tokyo (JP)

( * ) Notice: Subject to any disclaimer, the term of this patent is extended or adjusted under 35 U.S.C. 154(b) by 80 days.

(21) Appl. No.: 15/469,665

(22) Filed: Mar. 27, 2017

(65) Prior Publication Data

US 2017/0282998 A1 Oct. 5, 2017

(30) Foreign Application Priority Data

Mar. 31, 2016 (JP) .................. 2016-073407

(51) Int. Cl.
*B62K 25/28* (2006.01)
*B62M 9/16* (2006.01)

(52) U.S. Cl.
CPC ............. *B62K 25/283* (2013.01); *B62M 9/16* (2013.01)

(58) Field of Classification Search
CPC ....... B62K 25/28; B62K 25/283; B62K 25/20
See application file for complete search history.

(56) References Cited

U.S. PATENT DOCUMENTS

| 4,813,697 A | 3/1989 | Takada |
| 8,550,201 B2 * | 10/2013 | Uchiyama ............ B62K 25/286 180/227 |
| 2003/0010557 A1 | 1/2003 | Miyashiro |
| 2005/0151346 A1 | 7/2005 | James |
| 2017/0282999 A1 * | 10/2017 | Hiramaru ................ B62M 9/16 |

FOREIGN PATENT DOCUMENTS

| JP | 63-16991 U | 2/1988 |
| JP | 2007-1472 A | 1/2007 |
| JP | 2008-162513 A | 7/2008 |
| JP | 2009-73285 A | 4/2009 |
| JP | 3150017 U | 4/2009 |
| JP | 2009-208622 A | 9/2009 |
| JP | 2009-227118 A | 10/2009 |
| JP | 2011-105213 A | 6/2011 |
| JP | 2012-131333 A | 7/2012 |
| JP | 2014-19230 A | 2/2014 |

OTHER PUBLICATIONS

Japanese Notice of Reasons for Rejection for Japanese Application No. 2016-073407, dated Mar. 6, 2018, with an English translation.
Extended European Search Report for European Application No. 17162989.2, dated Sep. 12, 2017.
Japanese Notice of Reasons for Rejection for Japanese Application No. 2016-073407, dated Jul. 18, 2017, with an English translation.

\* cited by examiner

*Primary Examiner* — Kevin Hurley
(74) *Attorney, Agent, or Firm* — Birch, Stewart, Kolasch & Birch, LLP

(57) ABSTRACT

A swing arm includes an arm main body formed of a pipe member, and a reinforcement member configured to reinforce an axle support region of the arm main body. The arm main body has a notch formed by cutting out a portion of a region of a circumferential wall facing in a vehicle width direction. The reinforcement member is joined to the notch of the circumferential wall.

7 Claims, 8 Drawing Sheets

SWING ARM OF SADDLE RIDING VEHICLE

CROSS-REFERENCE TO RELATED APPLICATION

Priority is claimed on Japanese Patent Application No. 2016-073407, filed Mar. 31, 2016, the content of which is incorporated herein by reference.

BACKGROUND

Field of the Invention

The present invention relates to a swing arm of a saddle riding vehicle configured to vertically and swingably support a rear wheel.

Description of Related Art

As a swing arm of a saddle riding vehicle, a configuration in which an arm main body formed by a pipe member is disposed along substantially a forward/rearward direction of the vehicle is known (for example, see Japanese Utility Model Registration No. 3150017).

In the swing arm disclosed in Japanese Utility Model Registration No. 3150017, the arm main body is formed by the pipe member, an axle support section configured to support an axle of a rear wheel is installed at a rear region of the arm main body, and a front end side of the arm main body is vertically and swingably supported by a vehicle body frame.

SUMMARY

However, in the swing arm disclosed in Japanese Utility Model Registration No. 3150017, the arm main body is formed by the pipe member having a substantially constant thickness. For this reason, when a wall thickness of the pipe member is increased in order to increase support stiffness with respect to the axle, the weight is increased by an increment of the thickness and an occupation width in a vehicle width direction is increased.

An aspect of the present invention is directed to provide a swing arm of a saddle riding vehicle capable of increasing support stiffness with respect to an axle while suppressing an increase in weight and an increase in occupation width in a vehicle width direction.

An aspect of the present invention employs the following configurations in order to solve the above-mentioned problems.

(1) A swing arm of a saddle riding vehicle according to an aspect of the present invention includes an arm main body formed of a pipe member; and a reinforcement member configured to reinforce an axle support region of the arm main body, wherein the arm main body has a notch formed by cutting a portion of a region of a circumferential wall of the arm main body facing in a vehicle width direction, and the reinforcement member is joined to the notch of the circumferential wall.

According to the above-mentioned configuration, a width in the vehicle width direction of a portion of the circumferential wall of the arm main body is reduced by the presence of the notch, and the separate reinforcement member is joined to the portion in which the width is reduced. For this reason, in comparison with the case in which the reinforcement member is joined to the arm main body without forming the notch, an occupation width of the swing arm in the vehicle width direction can be narrowed and the weight can be reduced. Further, as the reinforcement member having high stiffness is used, support stiffness with respect to the axle can also be increased.

(2) In the swing arm of the saddle riding vehicle of the above-mentioned (1), the notch is formed at a region of the circumferential wall facing the inside in the vehicle width direction, and the reinforcement member may have an axle support section disposed within a height range of the arm main body when seen in a side view.

In this case, the axle support section of the reinforcement member is joined to the region of the circumferential wall of the arm main body facing the inside in the vehicle width direction, and in this state, the axle support section of the reinforcement member is disposed within the height range of the arm main body when seen in a side view. For this reason, the axle support section of the reinforcement member is hidden behind the arm main body to make it difficult to be seen from the outside of the vehicle. Accordingly, as the above-mentioned configuration is employed, the appearance of the vehicle can be improved.

(3) In the swing arm of the saddle riding vehicle of the above-mentioned (1) or (2), the reinforcement member may have a support hole configured to support an axle, and the notch of the arm main body may be cut out throughout a range surrounding the support hole of the reinforcement member.

In this case, since there is no need to form the support hole configured to support the axle in the arm main body, the arm main body can be easily machined. In addition, since an opening area of the notch of the arm main body is larger than that of the support hole, a joining area of the reinforcement member with respect to the arm main body can be sufficiently and largely secured. Accordingly, as the above-mentioned configuration is employed, a joining strength of the reinforcement member with respect to the arm main body can be increased.

(4) In the swing arm of the saddle riding vehicle according to any one of the above-mentioned (1) to (3), the reinforcement member may have the axle support section configured to support the axle, and a cushion connecting section to which an end portion of a rear cushion is connected.

In this case, since the cushion connecting section is installed at the reinforcement member configured to reinforce the axle support region of the arm main body, there is no need to attach the separate cushion connecting member to the arm main body. Accordingly, as this structure is employed, the number of parts attached to the arm main body can be reduced and the man-hours for installing parts with respect to the arm main body can be reduced.

(5) In the swing arm of the saddle riding vehicle of the above-mentioned (4), cover fixing sections configured to fix a chain cover that covers the outside of a chain for driving a rear wheel may be formed at the cushion connecting section.

In this case, since the cover fixing section is installed at the cushion connecting section of the reinforcement member, there is no need to separately attach the cover fixing section to the arm main body. Accordingly, as this configuration is employed, the number of parts can be reduced.

(6) In the swing arm of the saddle riding vehicle of the above-mentioned (4) or (5), the reinforcement member may have joining sections joined to the arm main body so as to extend forward and rearward and sandwiching the cushion connecting section.

In this case, since the load input from the rear cushion into the cushion connecting section can be distributed in wide regions in front of and behind the cushion connecting section to be supported by the arm main body, the input load from the rear cushion can be stably supported by the arm main body while suppressing an increase in wall thickness of the reinforcement member. Accordingly, as the configuration is employed, an occupation width in the vehicle width direction of the swing arm can be further suppressed.

(7) In the swing arm of the saddle riding vehicle according to any one of the above-mentioned (4) to (6), the cushion connecting section may be formed to be offset with respect to the support hole of the reinforcement member in a forward/rearward direction of a vehicle body.

In this case, since a load input section from the rear cushion on the reinforcement member and a load input section from the axle are disposed at positions separated in the forward/rearward direction of the vehicle body, the load input from the reinforcement member into the arm main body can be distributed and supported in a wide range.

According to the aspect of the present invention, the notch is formed at a region, facing in the vehicle width direction, of the circumferential wall of the arm main body, and the separate reinforcement member is joined to the notch of the circumferential wall. For this reason, support stiffness with respect to the axle can be increased while suppressing an increase in weight and an increase in occupation width in the vehicle width direction.

DESCRIPTION OF EMBODIMENTS

Figure 1:
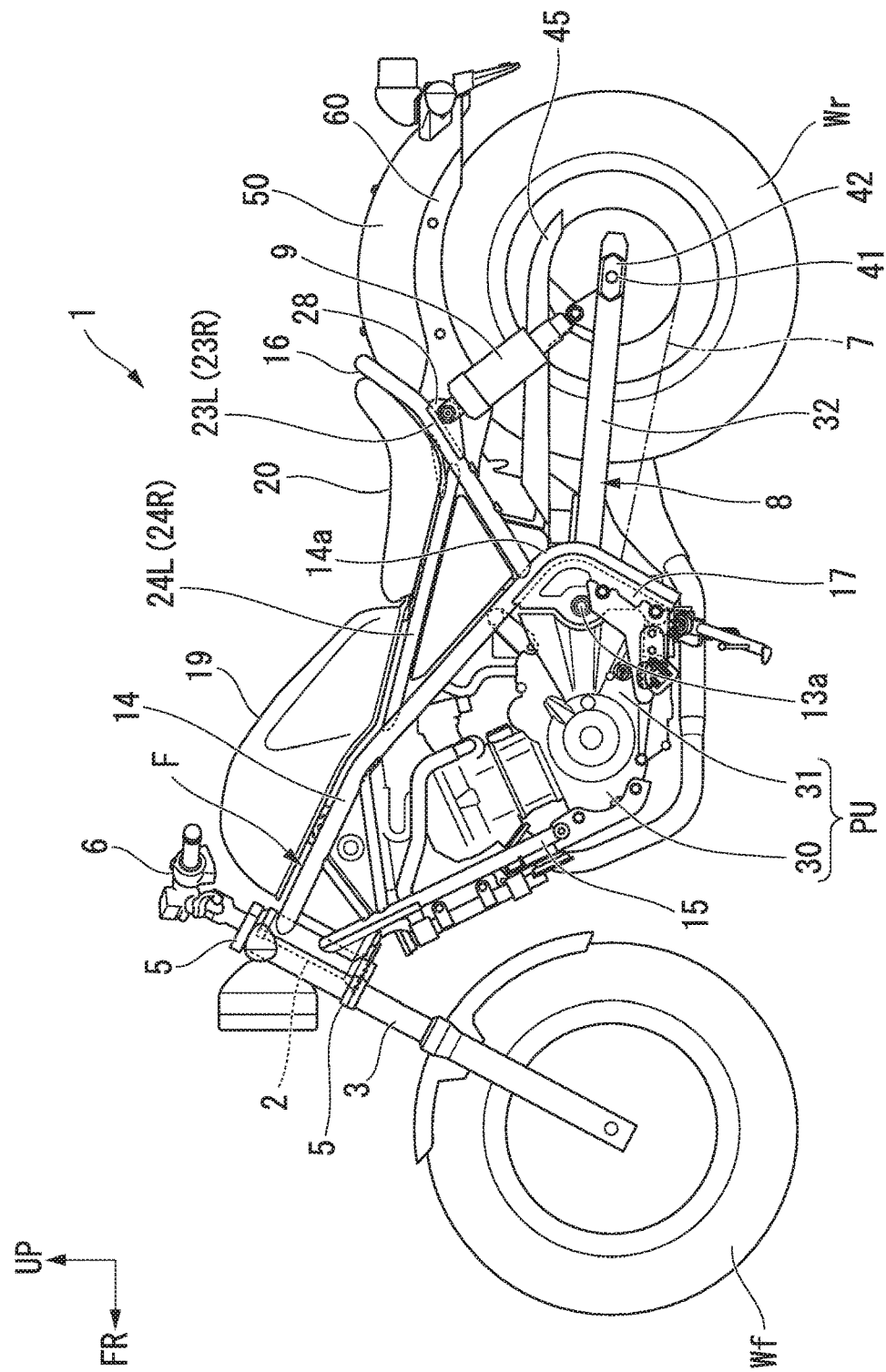
FIG. 1 is a side view of a saddle riding vehicle according to an embodiment of the present invention.

Hereinafter, an embodiment of the present invention will be described based on the accompanying drawings. Further, directions of forward, rearward, left, right, and so on, described below are the same as directions of a vehicle described below unless the context clearly indicates otherwise.

In addition, in appropriate places in the drawings used in the following description, an arrow FR showing a forward direction with respect to a vehicle, an arrow LH showing a leftward direction with respect to the vehicle and an arrow UP showing an upward direction with respect to the vehicle are provided.

FIG. 1 is a view showing a left side surface of a saddle riding vehicle according to the embodiment. The saddle riding vehicle according to the embodiment is a so-called cruiser type motorcycle 1 in which a vehicle height is decreased and a forward/rearward length is increased. A front wheel Wf of the motorcycle 1 is rotatably supported by lower end portions of a pair of left and right front forks 3. The left and right front forks 3 are supported by a head pipe 2 of a front end portion of a vehicle body frame F via upper and lower bridge members 5 and a steering stem (not shown). A bar type steering handle 6 is attached to the upper bridge member 5.

A rear wheel Wr of the motorcycle 1 is supported by rear end portions of a swing arm 8. A front end portion of the swing arm 8 is vertically and swingably supported by a pivot section 13a of the vehicle body frame F. The rear wheel Wr is linked to a power unit PU of the motorcycle 1 via, for example, a transmission mechanism or the like constituted by a chain 7. Lower end portions of rear cushions 9 serving as a suspension part of the rear wheel Wr side are connected to the swing arm 8 in the vicinity of rear wheel support sections.

Figure 2:
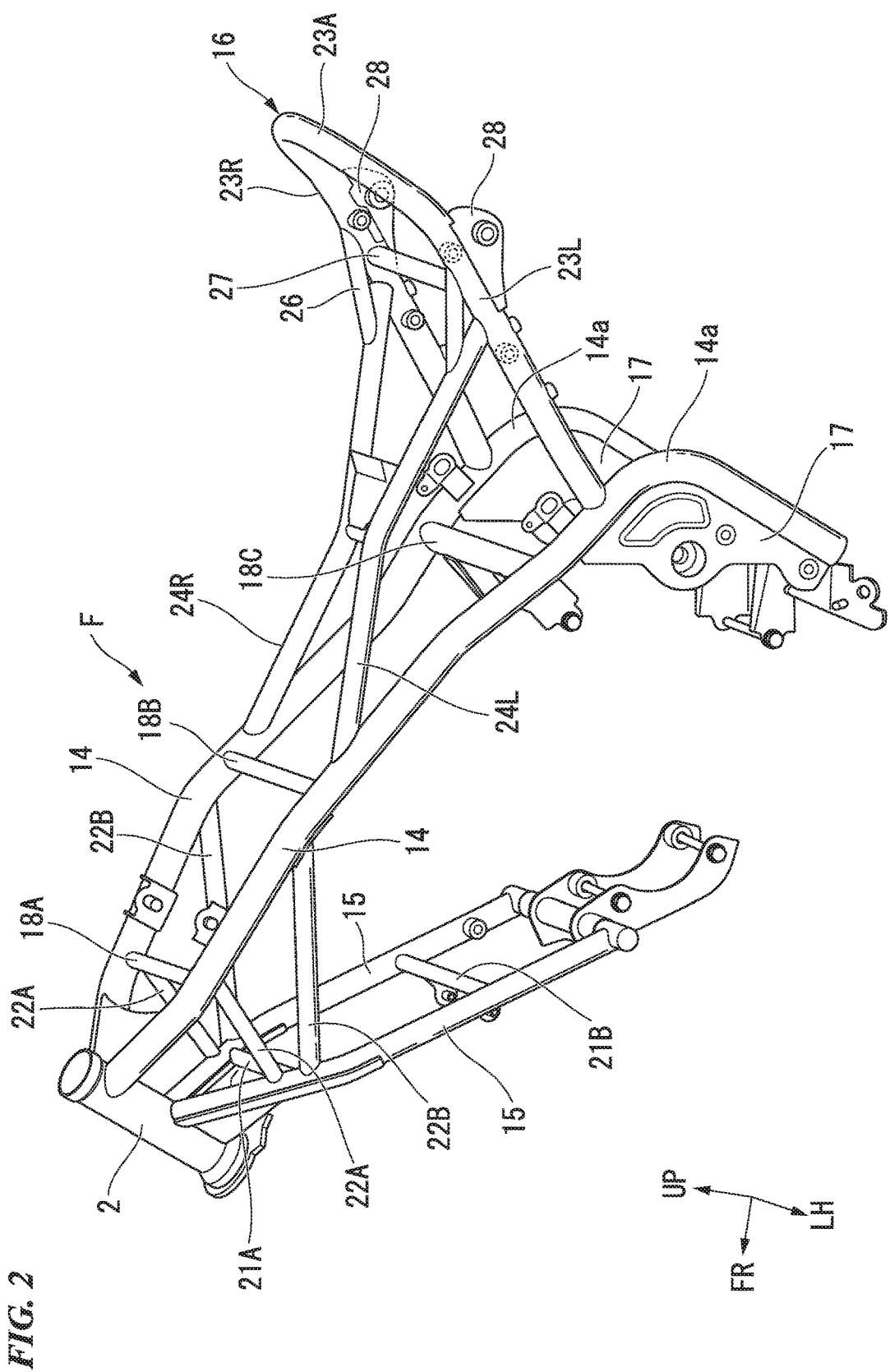
FIG. 2 is a perspective view showing a vehicle body frame of the saddle riding vehicle according to the embodiment of the present invention.

FIG. 2 is a view showing a major part of the vehicle body frame F of the motorcycle 1.

As also shown in FIG. 2, the vehicle body frame F includes the head pipe 2 disposed at a front end portion and configured to support a steering stem (not shown), a pair of left and right main frames 14 branched off from an upper rear side of the head pipe 2 toward left and right sides, extending rearward and downward when seen in a side view and then extending downward by changing a direction at rear curved sections 14a, a pair of left and right down frames 15 branched off from a lower rear side of the head pipe 2 toward left and right sides and extending rearward and downward to be steeply inclined more than the main frames 14 when seen in a side view, a rear frame 16 connected to rear upper surface sides of the left and right main frames 14, and a rear fender frame 60 (see FIG. 1) having a front region connected to the rear frame 16 and configured to support a rear fender 50 that covers an upper part of the rear wheel Wr. Further, in FIG. 2, the rear fender frame 60 is not shown.

The left and right main frames 14, in a plan view, are curved toward the outside in the vehicle width direction from joining sections at front end portions joining with the head pipe 2 such that once a separation width therebetween becomes a constant width, the separation width therebetween is narrowed toward the vicinity of the rear curved sections 14a, and then, the separation width is widened again downward from the vicinity of the rear curved sections 14a. The left and right main frames 14 are connected by a plurality of cross pipes 18A, 18B and 18C. A front region of a fuel tank 19 is disposed over a region, in which the separation width is large, of front section sides of the left and right main frames 14, and a rear region of the fuel tank 19 and an occupant-sitting seat 20 are disposed over a region, in which the separation width is small, of rear section sides of the left and right main frames 14 via the rear frame 16.

In addition, pivot blocks 17 are attached to the rear curved sections 14a of the left and right main frames 14 and lower regions thereof. The pivot sections 13a configured to support the front end portions of the swing arm 8 are attached to the pivot blocks 17.

The left and right down frames 15 are connected to each other by a plurality of cross pipes 21A and 21B, and upper side regions are connected to front regions of the left and right main frames 14 by gusset frames 22A and 22B.

The power unit PU in which an engine 30 and a gear box 31 are integrated is disposed in a region surrounded by the down frames 15 and the main frames 14. The power unit PU is attached to the down frames 15 and the main frames 14 to constitute a portion of the vehicle body frame F.

The rear frame 16 has a pair of left and right seat frame sections 23L and 23R extending from upper surfaces close to the rear curved sections 14a of the left and right main frames 14 toward rear upper sides (extending toward a rear position of the seat 20), and a connecting section 23A that is curved in substantially a U shape and that is configured to connect rear sections of the left and right seat frame sections 23L and 23R.

The rear frame 16 has a pair of left and right seat sub-frame sections 24L and 24R that is further extending from substantially intermediate positions in an extension direction of the left and right seat frame sections 23L and 23R toward front upper sides and that is having front end portions connected to the left and right main frames 14. In addition, cushion brackets 28 to which upper end portions of the rear cushions 9 are connected are fixed to the left and right seat frame sections 23L and 23R in the vicinity of the seat sub-frame sections 24L and 24R.

Figure 3:
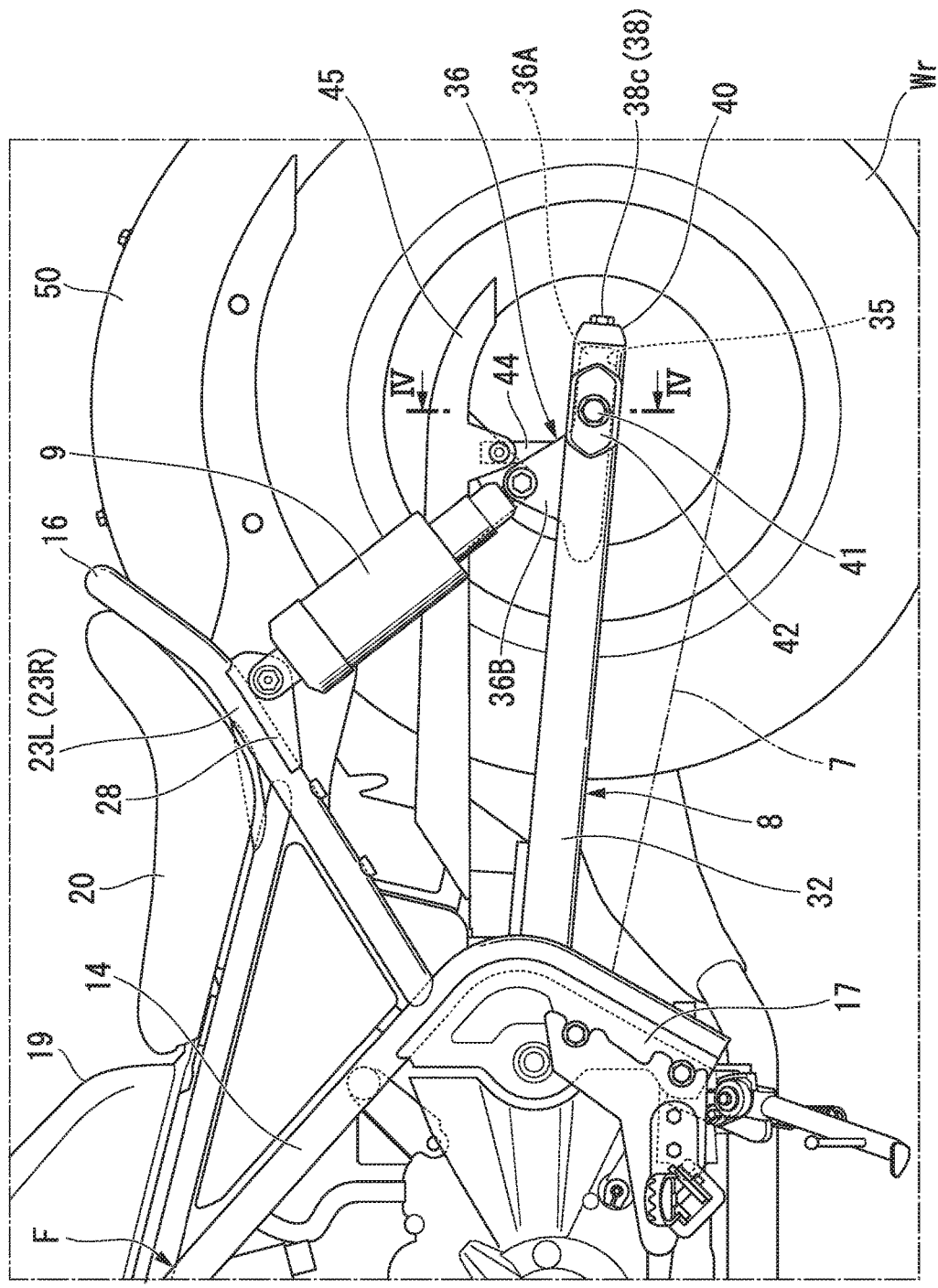
FIG. 3 is a side view showing the saddle riding vehicle according to the embodiment of the present invention, in which a portion of FIG. 1 is enlarged.
Figure 4:
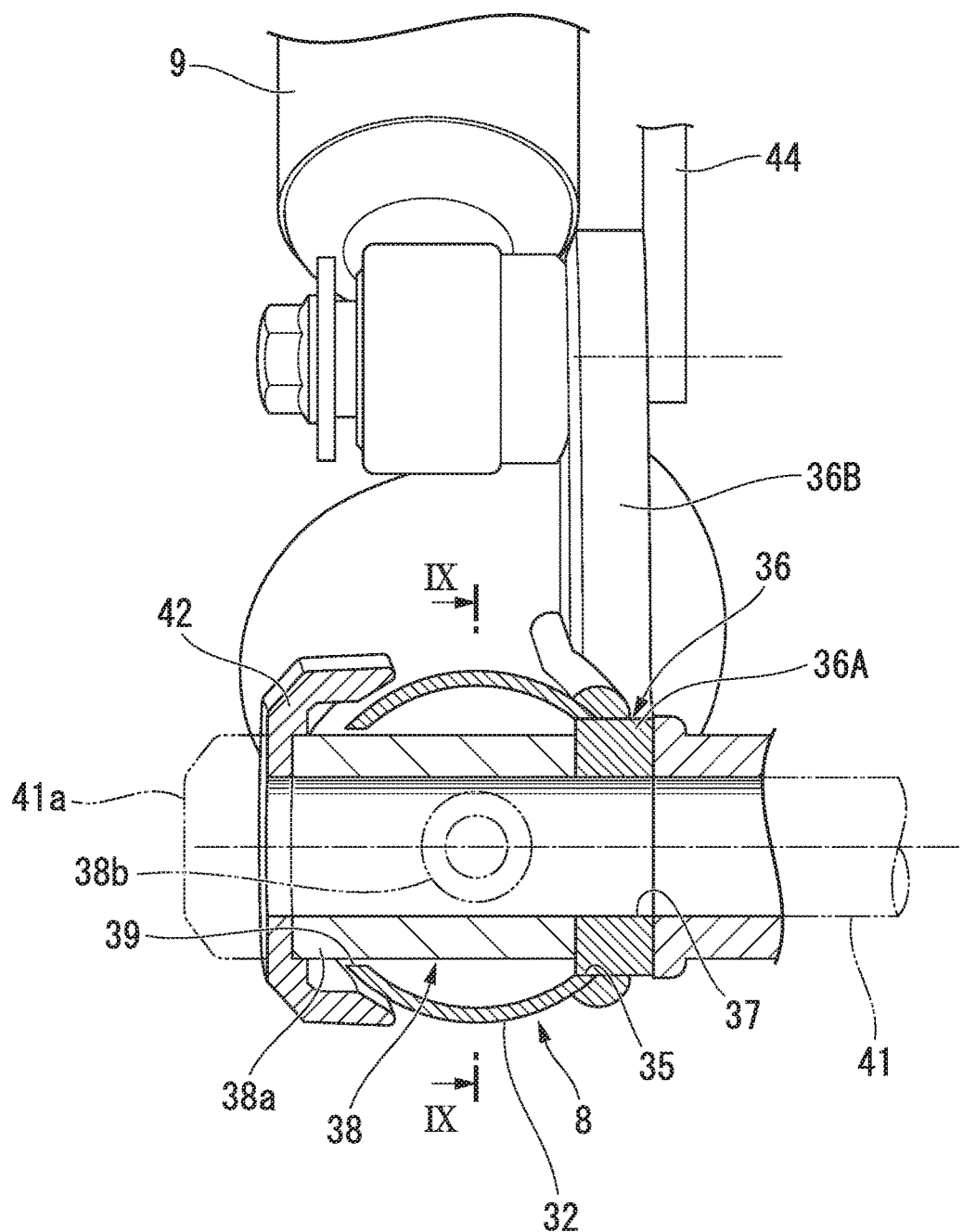
FIG. 4 is a cross-sectional view taken along line IV-IV of FIG. 3 of the saddle riding vehicle according to the embodiment of the present invention.
Figure 5:
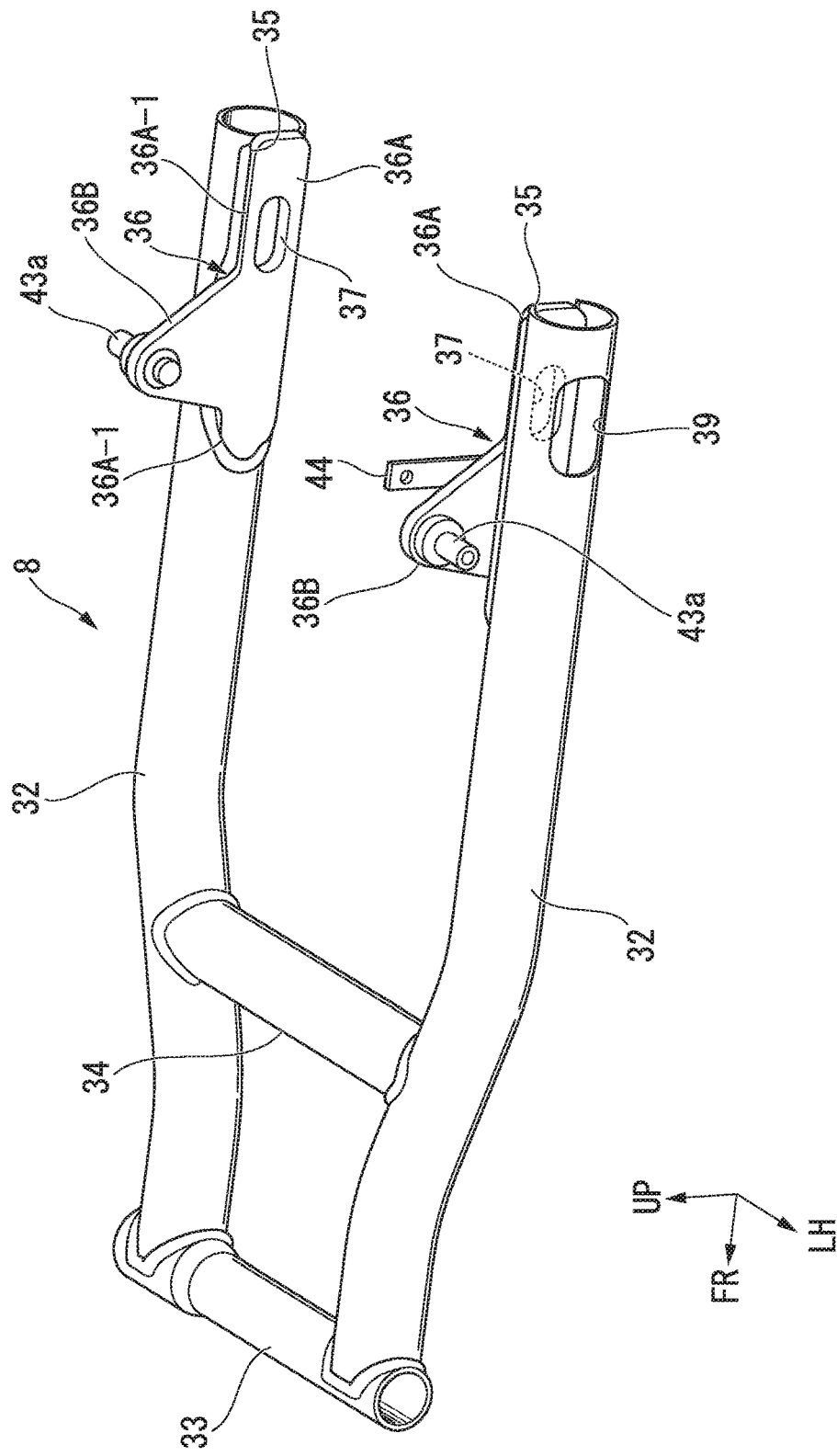
FIG. 5 is a perspective view of a swing arm according to the embodiment of the present invention.
Figure 6:
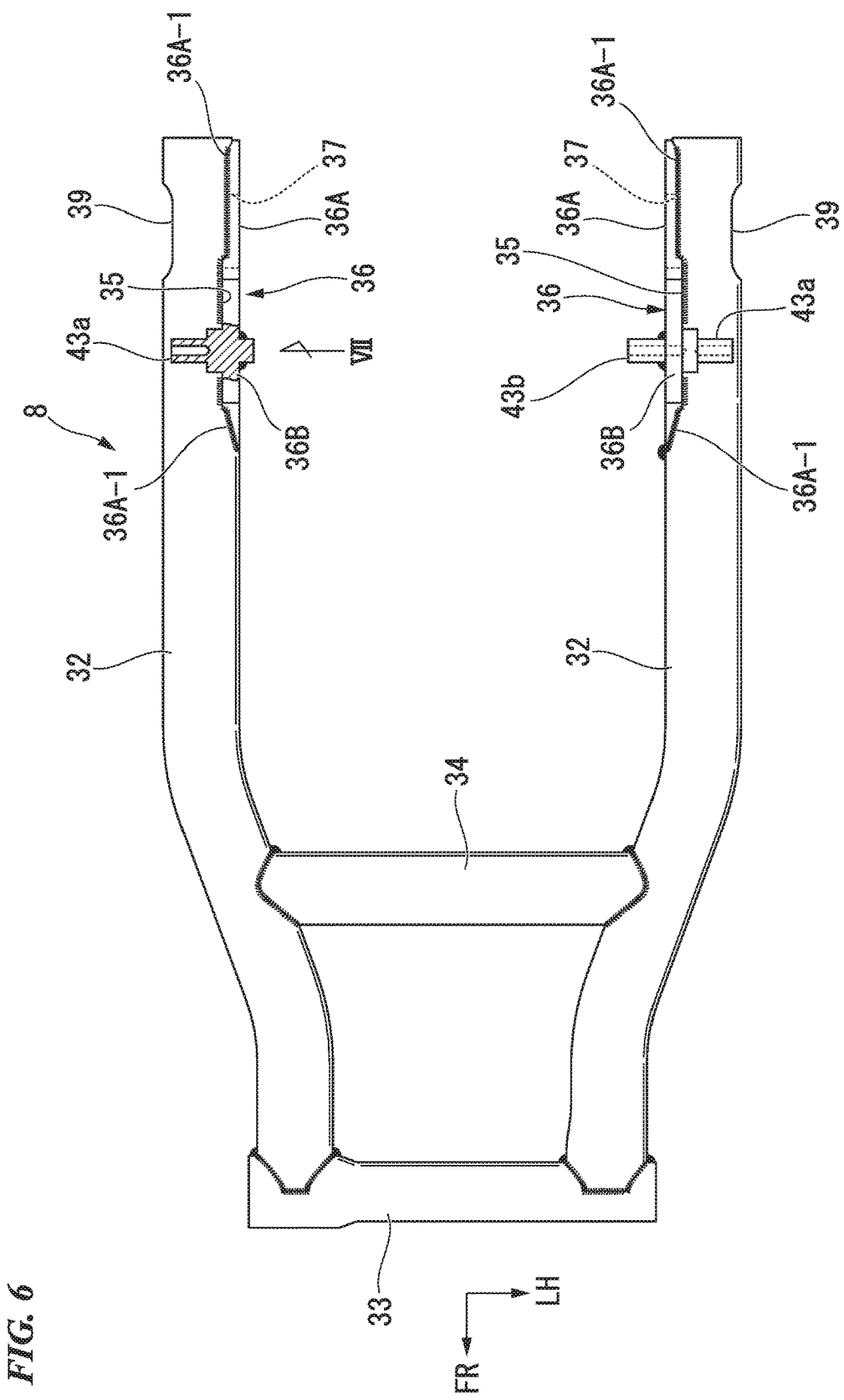
FIG. 6 is a partial cross-sectional plan view of the swing arm according to the embodiment of the present invention.
Figure 7:
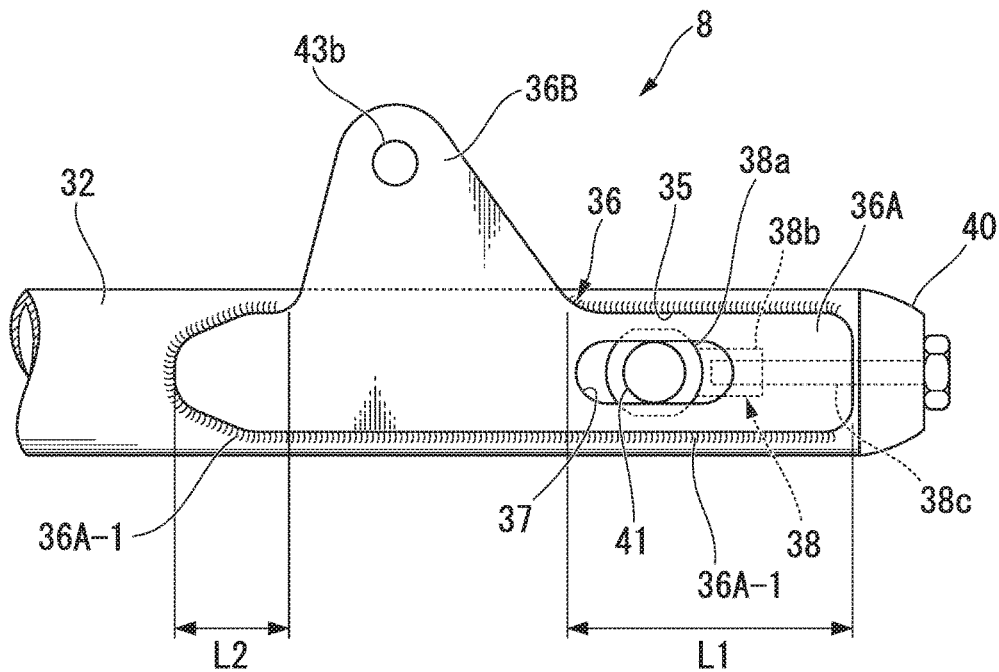
FIG. 7 is a view of the swing arm according to the embodiment of the present invention when seen from an arrow VII of FIG. 6.
Figure 8:
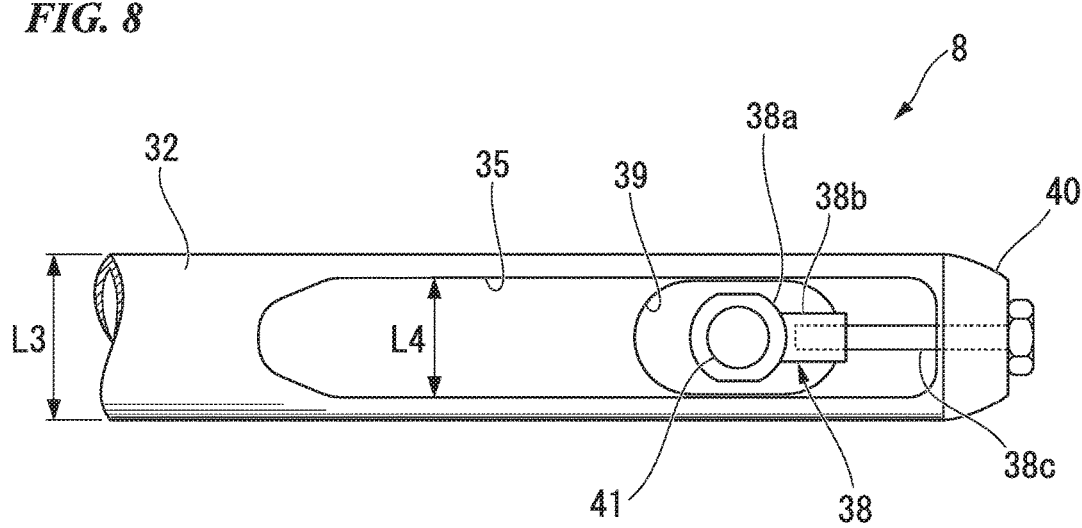
FIG. 8 is a view of the swing arm according to the embodiment of the present invention, in which a reinforcement member is removed, when seen from an arrow VII of FIG. 6.

FIG. 3 is a view showing an enlarged portion of FIG. 1, and FIG. 4 is a cross-sectional view of a portion of the swing arm 8 taken along line IV-IV of FIG. 3. In addition, FIG. 5 is a view showing the swing arm 8 when seen from a rear upper side of a left side, and FIG. 6 is a partial cross-sectional plan view of the swing arm 8. FIG. 7 is view showing the swing arm 8 of FIG. 6 when seen from an arrow VII, and FIG. 8 is a view showing the swing arm 8 of FIG. 6, in which a reinforcement member 36 (to be described below) is removed, when seen from an arrow VII.

As shown in FIG. 5, the swing arm 8 has a pair of left and right arm main bodies 32 extending substantially along a forward/rearward direction of the vehicle body, and a first connecting member 33 and a second connecting member 34 configured to connect front section sides of the left and right arm main bodies 32 to each other. The first connecting member 33 configured to connect front end portions of the left and right arm main bodies 32 is vertically and swingably supported with respect to the pivot section 13a of the vehicle body frame F.

The left and right arm main bodies 32 are mainly constituted by a tubular metal pipe member. In the case of the embodiment, the first connecting member 33 and the second connecting member 34 are also formed of a tubular metal pipe member. The left and right arm main bodies 32 are fixed to the first connecting member 33 and the second connecting member 34 through welding.

The vicinity of rear ends of the left and right arm main bodies 32 are made to be wheel support regions configured to support an axle 41 of the rear wheel Wr. A notch 35 formed by cutting a portion of a circumferential wall of the pipe member is formed at a portion of the wheel support region, which is facing the inside in the vehicle width direction, of each of the arm main bodies 32. As shown in FIGS. 6, 7 and 8, the notch 35 is formed in a substantially elongated rectangular shape in an extension direction of the arm main body 32. Further, strictly speaking, the notch 35 has corner sections of a rectangular shape, which are formed in arc shapes. In addition, a width L4 in an upward/downward direction of the notch 35 is set to be smaller than an upward/downward width (a diameter, a height range) L3 of the arm main body.

The reinforcement member 36 configured to reinforce the wheel support region is attached to the notch 35 of the circumferential wall of each of the arm main bodies 32. The reinforcement member 36 is formed by a metal plate member having a wall thickness larger than that of the arm main body 32, and has an axle support section 36A having substantially the same shape (the substantially rectangular shape) as the notch 35 of the arm main body 32 and a cushion connecting section 36B protruding upward from an upper section near the front section of the axle support section 36A in a substantially triangular shape. Accordingly, since the cushion connecting section 36B is formed to have a diverging shape toward the axle support section 36A, a load from the rear cushions 9 can be efficiently transmitted to the axle support section 36A extending in the extension direction of the arm main body 32.

The reinforcement member 36 is fixed to the circumferential wall of the arm main body 32 through welding such that the axle support section 36A closes the notch 35 of the arm main body 32. Accordingly, the axle support section 36A is disposed within the height range L3 of the arm main body 32 when seen in a side view.

The cushion connecting section 36B has an upper section protruding above an upper end portion of the pipe member of the arm main body 32 in a state in which the reinforcement member 36 is fixed to the pipe member of the arm main body 32 through welding. In the case of the embodiment, an outer circumferential portion of the axle support section 36A is a joining section 36A-1 fixed to the circumferential wall of the pipe member of the arm main body 32 through welding. The joining sections 36A-1 extend toward a front side and a rear side of the arm main bodies 32 with the cushion connecting section 36B sandwiched therebetween.

A support hole 37 elongated in an extension direction of the reinforcement member 36 (an extension direction of the arm main body 32) is formed at a portion of the axle support section 36A of the reinforcement member 36 which is behind a continuous installation position of the cushion connecting section 36B. As shown in FIG. 4, the axle 41 of the rear wheel Wr is fitted into the elongated support hole 37. The notch 35 of the arm main body 32 is cut out throughout a range surrounding the support hole 37 of the reinforcement member 36.

The cushion connecting section 36B of the reinforcement member 36 is set to be offset with respect to the support hole 37 of the axle support section 36A in the forward/rearward direction of the vehicle body (toward a front side of the vehicle body). For this reason, the load input into the axle support section 36A from the rear cushions 9 and the axle 41 can be distributed and supported within a wide range on the arm main body 32.

In addition, in the case of the embodiment, as shown in FIG. 7, the joining section 36A-1 of the axle support section 36A with the pipe member of the arm main body 32 is set such that a forward/rearward length L1 of the region surrounding the support hole 37 is larger than a forward/rearward length L2 of a region in front of a lower end of the cushion connecting section 36B. For this reason, the load input from the axle 41 can be received in a region in which a forward/rearward length is large and welding strength is high.

An elongated opening 39 is formed in an outer side of the circumferential wall of the arm main body 32 in the vehicle width direction to oppose the support hole 37 of the reinforcement member 36. The opening 39 has an opening width in the upward/downward direction that is set to be larger than an opening width of the support hole 37 in the upward/downward direction. An axle support block 38a (an axle support member) of a chain adjuster 38 (to be described below) and an end portion of the axle 41 protrude outward from the opening 39 in the vehicle width direction. The elongated opening 39 of the arm main body 32 and a circumferential edge portion thereof are covered by a cover member 42 from the outside in the vehicle width direction.

Figure 9:
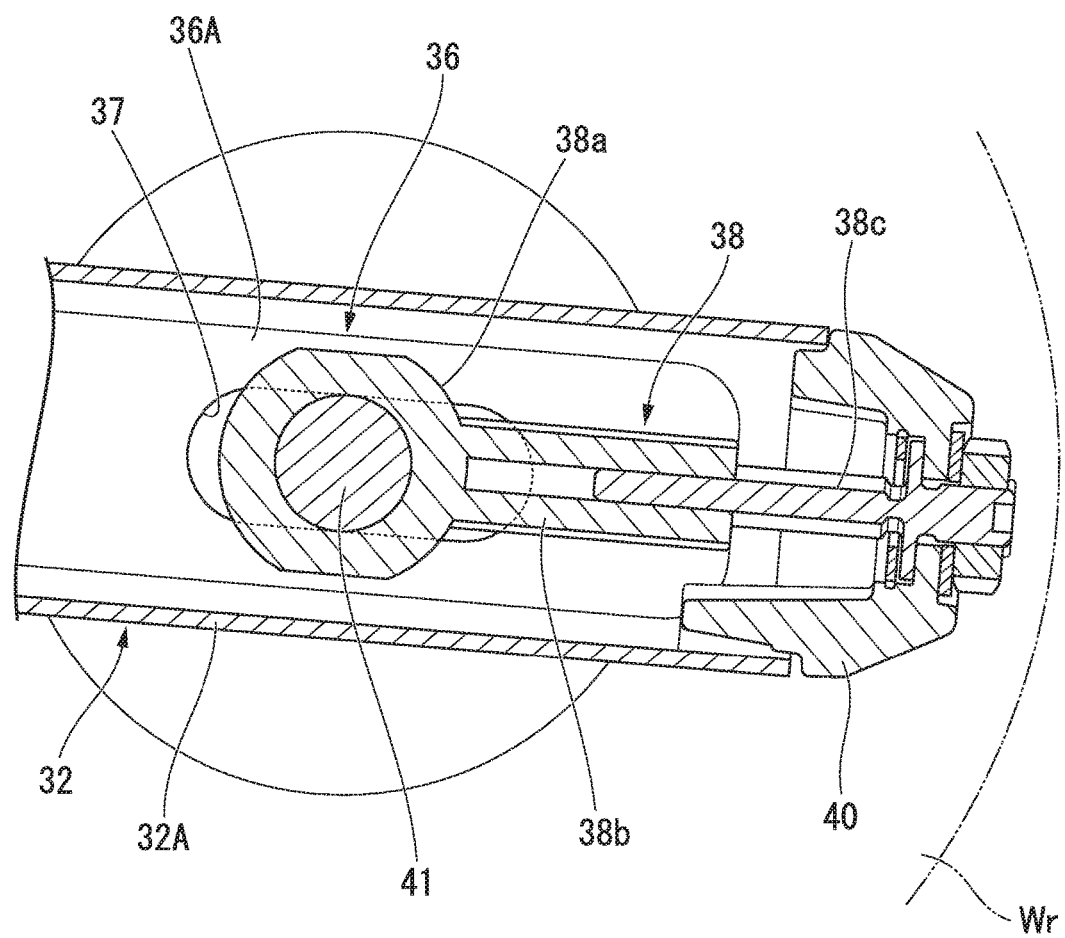
FIG. 9 is a cross-sectional view taken along line IX-IX of FIG. 4 of the swing arm according to the embodiment of the present invention.

FIG. 9 is a view showing a cross section taken along line IX-IX of FIG. 4.

As shown in FIGS. 7 to 9, the chain adjuster 38 is formed such that a screw receiving section 38*b* protrudes from a rear section of the axle support block 38*a* and a tip portion of an adjust screw 38*c* is screwed into the screw receiving section 38*b*. A head section of the adjust screw 38*c* is rotatably and adjustably supported by a cap 40 attached to the rear end portion of the arm main body 32. In the axle support block 38*a*, a forward/rearward position in the arm main body 32 is appropriately adjusted by rotation of the adjust screw 38*c*.

The axle support block 38*a* is formed by a substantially tubular metal block, upper and lower sides of which are cut out flatly. The upward/downward width of the axle support block 38*a* is set to be larger than the upward/downward width of the support hole 37 of the reinforcement member 36 and smaller than the upward/downward width of the opening 39 of the arm main body 32.

As shown in FIGS. 4 and 7 to 9, the axle 41 is inserted into the shaft hole of the axle support block 38*a*. An end surface on an inner side in the vehicle width direction of the axle support block 38*a* is formed to abut a surface on an outer side of the axle support section 36A of the reinforcement member 36 in the vehicle width direction (more specifically, an upper edge region and a lower edge region of the support hole 37 in the surface on an outer side of the axle support section 36A in the vehicle width direction).

In the case of the embodiment, the surface on an outer side of the axle support section 36A in the vehicle width direction is a fixing surface to which the axle support block 38*a* is fixed together with the axle 41. In addition, the end surface on an inner side of the axle support block 38*a* in the vehicle width direction is an abutting surface that abuts the fixing surface of the axle support section 36A. The axle support block 38*a* is fastened and fixed to the fixing surface of the reinforcement member 36 by fastening of the axle 41 (a bolt) from the outside in the vehicle width direction. The rear wheel Wr is supported by the reinforcement member 36 of the arm main body 32 via the axle support block 38*a*. Accordingly, the forward/rearward position of the axle 41 of the rear wheel Wr is adjustable by rotation of the adjust screw 38*c*.

In addition, as shown in FIG. 4, the end portion of the axle support block 38*a* on an outer side in the vehicle width direction protrudes outward in the vehicle width direction through the openings 39 of the arm main bodies 32. The common axle 41 (bolt shaft) is inserted through the arm main bodies 32 disposed at the left and right of the vehicle body with the rear wheel Wr sandwiched therebetween, and the axle support blocks 38*a* mounted on the left and right arm main bodies 32 are fastened and fixed to the left and right arm main bodies 32 (the reinforcement members 36) together with the axle 41. In the case of the embodiment, a flange-shaped head section 41*a* is integrally formed with one end of the axle 41, and a nut (not shown) is screwed onto the other end of the axle. The head section 41*a* of the axle 41 and the nut are disposed on an outer side of the left and right axle support blocks 38*a* in the vehicle width direction.

The cover members 42 configured to cover the openings 39 of the left and right arm main bodies 32 and fixed to the axle support blocks 38*a* are sandwiched between the head sections 41*a* of the axle 41 or the nuts and the end surfaces of the axle support blocks 38*a*. In other words, the left and right cover members 42 are fastened and fixed to the axle 41 in a state in which the axle support blocks 38*a* (axle support members) are sandwiched between walls (the reinforcement members) 36 on an inner side of the left and right arm main bodies 32 in the axial direction.

Outer protrusions 43*a* protruding outward in the vehicle width direction protrude from the cushion connecting sections 36B of the reinforcement members 36. Lower ends of the rear cushions 9 are fastened to the outer protrusions 43*a* by bolts. In addition, in the opposite reinforcement member 36 disposed at the left side of the vehicle and across the rear wheel Wr, a bracket 44 is integrally formed with the cushion connecting section 36B, and a chain cover 45 configured to cover the outside of the chain 7 for driving is fastened to the bracket 44 by a bolt. In the case of the embodiment, the bracket 44 installed at the reinforcement member 36 of the left side of the vehicle constitutes a cover fixing section.

As described above, in the swing arm 8 of the motorcycle 1 according to the embodiment, the notches 35 are formed at the circumferential walls of the arm main bodies 32 in the vicinity of the axle support regions, and the reinforcement members 36 having different wall thicknesses are joined to the notches 35. For this reason, a width in the vehicle width direction of the circumferential wall of the arm main body 32 in the vicinity of the wheel support region is narrowed by the notch 35, and the reinforcement member 36 is joined to a portion in which the width is narrowed.

Accordingly, in the swing arm 8 according to the embodiment, in comparison with the case in which the reinforcement member 36 is joined to the arm main body 32 without forming the notch 35, an occupation width of the swing arm 8 in the vehicle width direction can be narrowed and the weight can also be reduced. Further, in the swing arm 8 according to the embodiment, since support stiffness with respect to the axle 41 can be increased using the reinforcement member 36 having high stiffness, the support stiffness with respect to the axle can be increased while suppressing an increase in weight and an increase in occupation width in the vehicle width direction.

In addition, in the swing arm 8 according to the embodiment, the notches 35 are formed in the regions of the circumferential walls facing the inside in the vehicle width direction, and the axle support sections 36A of the reinforcement members 36 are joined to the arm main bodies 32 to be disposed within the height range L3 of the arm main bodies 32 when seen in a side view. For this reason, the axle support sections 36A of the reinforcement members 36 are hidden behind the arm main bodies 32 to make it difficult to be seen from the outside of the vehicle. Accordingly, when the swing arm 8 according to the embodiment is employed, the appearance of the vehicle can be improved.

In addition, in the case of the swing arm 8 according to the embodiment, since the notches 35 of the arm main bodies 32 are cut out throughout the ranges surrounding the support holes 37 of the reinforcement members 36, there is no need to form the support holes 37 in the arm main bodies 32 that require machining precision. For this reason, machining of the arm main bodies 32 can be facilitated. In addition, in the case of the embodiment, since the reinforcement members 36 are flat and thicker than the arm main bodies 32, the support holes 37 having high precision and high support stability can be easily obtained.

Further, in the swing arm 8 according to the embodiment, since the notches 35 of the arm main bodies 32 are cut out throughout the range surrounding the support holes 37 of the reinforcement members 36, an opening area of the notches 35 is larger than that of the support holes 37, and a joining area of the reinforcement members 36 with respect to the arm main bodies 32 can be sufficiently and largely secured. Accordingly, when the swing arm 8 according to the embodiment is employed, joining strength of the reinforcement members 36 with respect to the arm main bodies 32 can be further increased.

In addition, in the swing arm 8 according to the embodiment, since the cushion connecting sections 36B are integrally formed with the axle support sections 36A of the reinforcement members 36, there is no need to attach parts configured to connect the lower ends of the separate rear cushions 9 to the arm main bodies 32. Accordingly, when the swing arm 8 according to the embodiment is employed, the number of parts attached to the arm main bodies 32 can be reduced, and the man-hours for installing parts with respect to the arm main bodies 32 can also be reduced.

In addition, in the swing arm 8 according to the embodiment, the outer protrusions 43a configured to connect the lower ends of the rear cushions 9 and the bracket 44 configured to fix the chain cover 45 are installed at the cushion connecting sections 36B of the reinforcement members 36. For this reason, there is no need to separately attach the part configured to fix the chain cover 45 to the arm main body 32. Accordingly, when this configuration is employed, the installation of parts with respect to the arm main body can be easily performed while the number of parts can be further reduced.

In addition, as a variant of the swing arm 8 according to the embodiment, as shown in FIG. 6, the outer protrusion 43a configured to connect the lower end of the rear cushion 9 and an inner protrusion 43b configured to fix the chain cover 45 may coaxially protrude from the cushion connecting sections 36B of the reinforcement member 36 of the arm main body 32 at the left side in the vehicle width direction. Even in this case, there is no need to separately attach the part configured to fix the chain cover 45 to the arm main body 32. Accordingly, when this configuration is employed, the number of parts can be further reduced.

In addition, in the swing arm 8 according to the embodiment, the joining sections 36A-1 of the reinforcement members 36 with respect to the arm main bodies 32 extend forward and rearward with the cushion connecting section 36B sandwiched therebetween. For this reason, the load input from the rear cushions 9 into the cushion connecting sections 36B of the reinforcement members 36 can be distributed in wide regions in front of and behind the cushion connecting section 36B to be supported by the arm main bodies 32. Accordingly, when the swing arm 8 according to the embodiment is employed, the input load from the rear cushions 9 can be stabilized and supported by the arm main bodies 32 without increasing the wall thickness of the reinforcement member 36 unnecessarily, and as a result, an occupation width of the swing arm 8 in the vehicle width direction is further suppressed.

Further, in the swing arm 8 according to the embodiment, the cushion connecting section 36B of the reinforcement member 36 is formed to be offset with respect to the support hole 37 of the reinforcement member 36 in the forward/rearward direction of the vehicle body. For this reason, load input sections from the rear cushions 9 on the reinforcement members 36 and load input section from the axle 41 can be disposed at positions separated in the forward/rearward direction of the vehicle body. Accordingly, when the swing arm 8 according to the embodiment is employed, the load input from the reinforcement members 36 into the arm main bodies 32 can be distributed and supported in a wide range on the arm main bodies 32.

Further, the present invention is not limited to the above-mentioned embodiment but various design changes may be made without departing from the scope of the present invention.

In addition, all vehicles on which a driver rides on the vehicle body are included as the saddle riding vehicle, and in addition to the motorcycle (including a motorized bicycle and a scooter type vehicle), a three-wheeled vehicle as a two-front-wheeled and one-rear-wheeled vehicle or the like may also be included.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A swing arm of a saddle riding vehicle comprising:
   an arm main body formed of a pipe member; and
   a reinforcement member configured to reinforce an axle support region of the arm main body,
   wherein the arm main body has a notch formed by cutting a portion of a region of a circumferential wall of the arm main body facing in a vehicle width direction,
   wherein the reinforcement member is joined to the notch of the circumferential wall,
   wherein the reinforcement member has a support hole configured to support an axle, and
   wherein the notch of the arm main body is cut out throughout a range surrounding the support hole of the reinforcement member.

2. The swing arm of the saddle riding vehicle according to claim 1, wherein the notch is formed at a region of the circumferential wall facing the inside in the vehicle width direction, and
   wherein the reinforcement member has an axle support section disposed within a height range of the arm main body when seen in a side view.

3. The swing arm of the saddle riding vehicle according to claim 1, wherein the reinforcement member has the axle support section configured to support the axle, and a cushion connecting section to which an end portion of a rear cushion is connected.

4. The swing arm of the saddle riding vehicle according to claim 3, wherein a cover fixing section configured to fix a chain cover that covers the outside of a chain for driving a rear wheel is formed at the cushion connecting section.

5. The swing arm of the saddle riding vehicle according to claim 3, wherein the reinforcement member has joining sections joined to the arm main body so as to extend forward and rearward and sandwiching the cushion connecting section.

6. The swing arm of the saddle riding vehicle according to claim 3, wherein the cushion connecting section is formed to be offset with respect to the support hole of the reinforcement member in a forward/rearward direction of a vehicle body.

7. A swing arm of a saddle riding vehicle comprising:
   an arm main body formed of a pipe member; and
   a reinforcement member configured to reinforce an axle support region of the arm main body, wherein the arm main body has a notch formed by cutting a portion of a region of a circumferential wall of the arm main body facing in a vehicle width direction, wherein the reinforcement member is joined to the notch of the circumferential wall, wherein the reinforcement member has the axle support section configured to support the axle, and a cushion connecting section to which an end portion of a rear cushion is connected, and wherein a cover fixing section is configured to fix a chain cover that covers the outside of a chain for driving a rear wheel is formed at the cushion connecting section.

* * * * *